United States Patent [19]

Martin

[11] Patent Number: 5,245,639
[45] Date of Patent: Sep. 14, 1993

[54] CORE BARREL FLOW HOLE PLUG AND INSTALLATION METHOD THEREFOR

[75] Inventor: Kenneth A. Martin, Windsor, Conn.

[73] Assignee: Combustion Engineering, Inc., Windsor, Conn.

[21] Appl. No.: 837,809

[22] Filed: Feb. 18, 1992

[51] Int. Cl.5 ............................................. G21C 13/00
[52] U.S. Cl. .................................. 376/203; 376/204; 376/399
[58] Field of Search ............... 376/203, 204, 399, 400; 976/DIG. 176, DIG. 175; 220/233

[56] References Cited

U.S. PATENT DOCUMENTS 4,454,957  6/1984  Kwech et al. .................. 220/323
4,652,418  3/1987  Baric et al. .................... 376/245
4,693,389  9/1987  Kalen ............................. 220/236
4,786,465 11/1988  Ales ............................... 376/400
4,820,476  4/1989  Popalis ........................... 376/203

Primary Examiner—Donald P. Walsh
Assistant Examiner—Meena Chelliah
Attorney, Agent, or Firm—L. James Ristas; John H. Mulholland

[57] ABSTRACT

A plug assembly for plugging the flow hole of a core support barrel employs an offset arm for securing the plug to the core support barrel above the flow hole and the adjacent thermal shield. The disclosed embodiments do not require the cutting of an access opening through the thermal shield.

18 Claims, 4 Drawing Sheets

CORE BARREL FLOW HOLE PLUG AND INSTALLATION METHOD THEREFOR

BACKGROUND OF THE INVENTION

This invention relates generally to devices and techniques for plugging flow holes. More particularly, the present invention relates generally to devices and techniques for plugging the flow holes of the core support barrel of a nuclear reactor.

In some nuclear installations, fuel rod wear has been directly associated with the characteristics of the flow path through the reactor core. For example, it has been established that baffle jetting causes fuel rod wear under certain conditions. In some installations, the flow characteristics can be suitably modified to alleviate the wear to the fuel rod by modifying the reactor core flow path to an upflow-type core flow path. In order to implement the flow modification, it is necessary that existing core barrel flow holes be plugged. In some reactor designs, this may require the plugging of 16 angularly spaced core barrel flow holes. Moreover, the flow holes to be plugged are typically positioned below the level of the adjacent surrounding thermal shield, and thus the thermal shield may present a significant obstacle to the hole plugging process.

SUMMARY OF THE INVENTION

Briefly stated, the invention in a preferred form is a plug assembly and a plugging technique for a core barrel flow hole wherein a thermal shield surrounds the barrel and is space adjacent to the flow hole. The plug assembly comprises an offset arm having first and second end portions. The first end portion includes a plug which is dimensioned to seal against the core barrel boundaries of the hole. The plug may include a circumferential sealing lip or a tapered sealing surface. The second end portion constitutes a mounting head having a pair of openings which receive bolts. The bolts are anchored in threaded bores of the core support barrel. The arm is dimensioned so that the plug is inserted into the flow hole and the bolts are positioned above the level of the thermal shield to provide headroom for completing the installation of the plug assembly.

An installation method, in accordance with the invention, for plugging the flow hole of a core barrel having a thermal shield spaced from and surrounding the barrel adjacent to the hole comprises machining a threaded bore in the core barrel above the thermal shield. A plug member is positioned in the flow hole, and the plug member is staked to the threaded bore by bolts. The threaded bore is machined into the barrel.

An object of the invention is to provide a new and improved plug assembly and installation technique for plugging the flow hole of a core support barrel.

Another object of the invention is to provide a new and improved plug assembly which may be installed to the core barrel in an efficient process to provide a plug of high integrity.

A further object of the invention is to provide a new and improved plug assembly and installation method therefor which is designed to overcome the headroom constraints presented by the thermal shield.

Other objects of the invention will become apparent from the drawings and specification.

DETAILED DESCRIPTION OF THE PREFERRED EMBODIMENT

Figure 1:
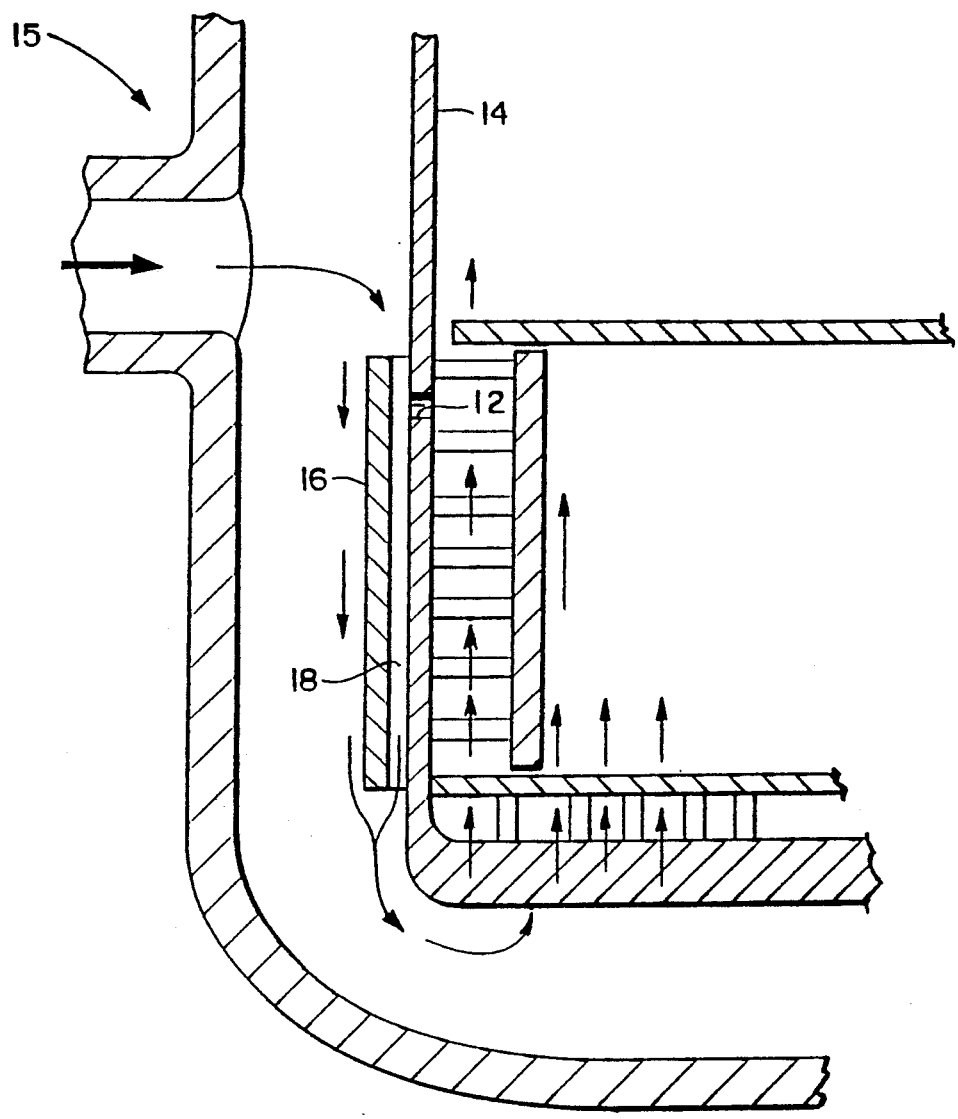
FIG. 1 is a fragmentary sectional view, partly broken away and partly in schematic, of a nuclear reactor for which the present invention has application.
Figure 2:
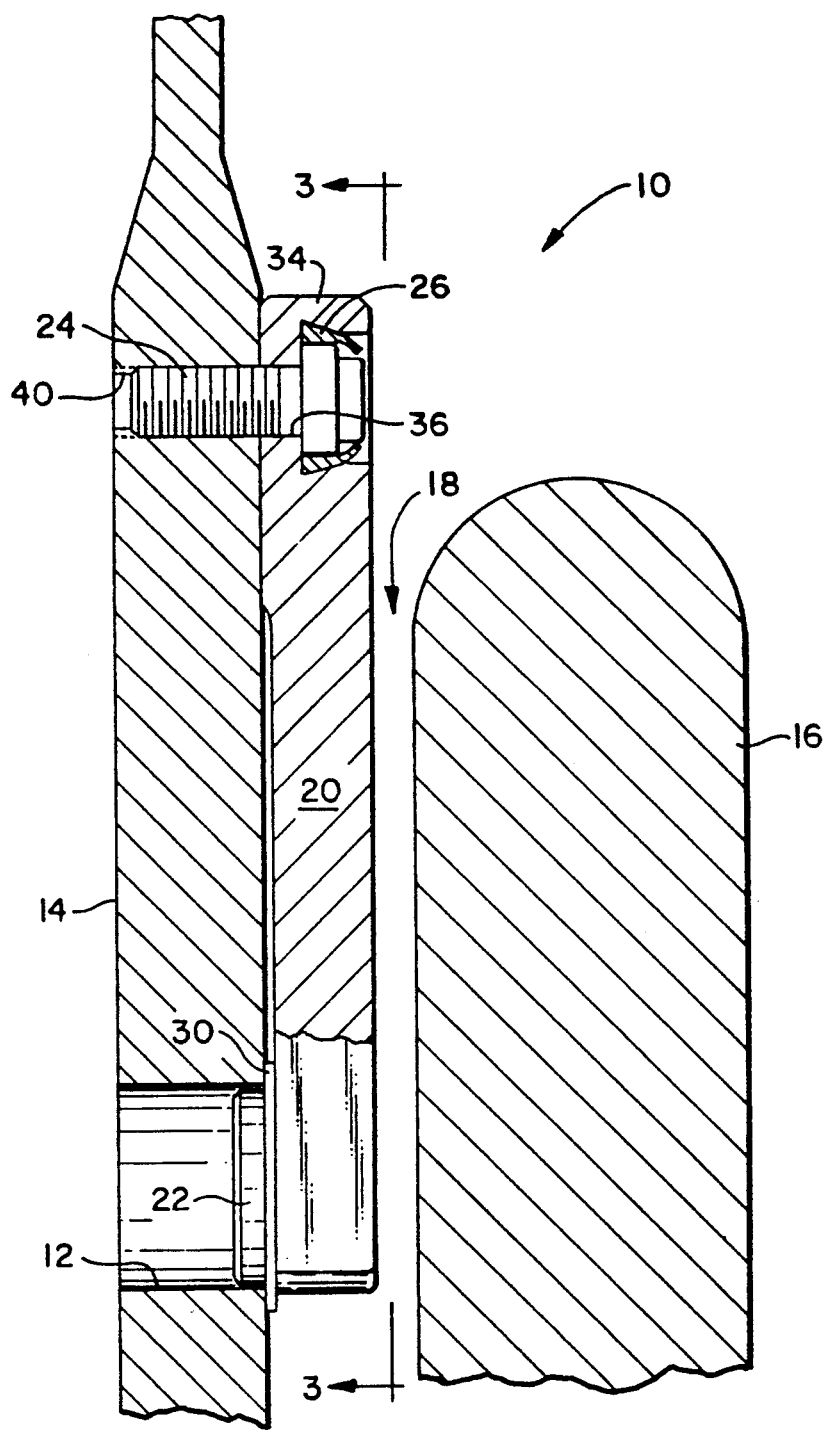
FIG. 2 is an enlarged fragmentary sectional view of a portion of the nuclear reactor of FIG. 1, viewed from the opposite side thereof, further illustrating an installed plug assembly in accordance with the present invention.
Figure 3:
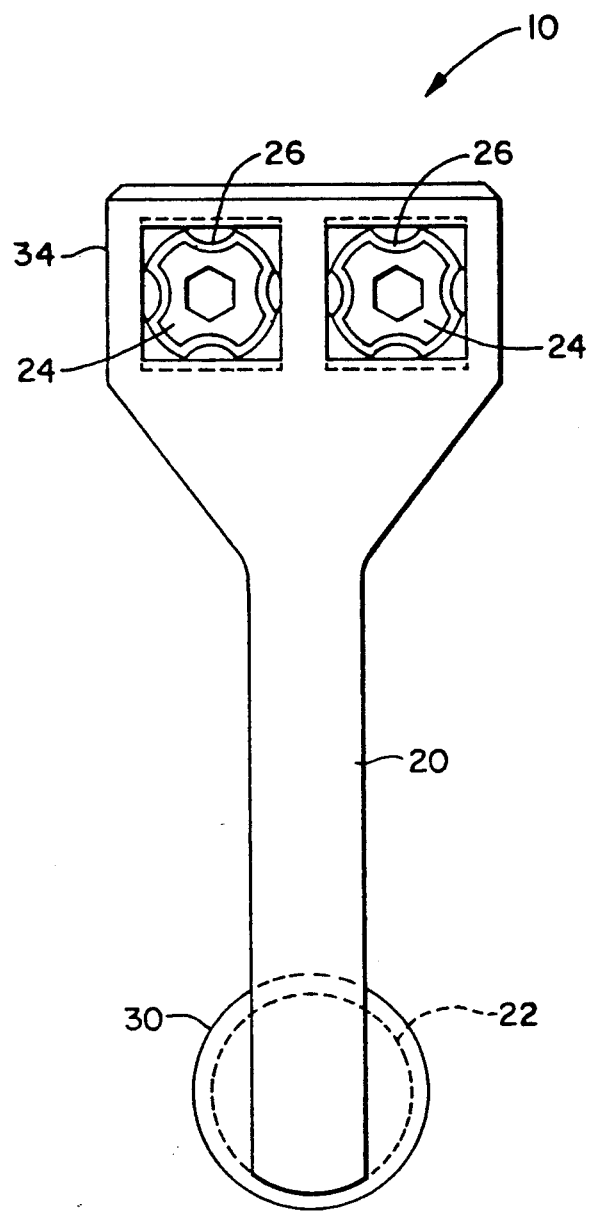
FIG. 3 is an interior side elevational view, partly in phantom, of the plug assembly of FIG. 2 taken along the line 3—3 thereof; and, FIG. 4 is a sectional view of a second embodiment of an installed plug assembly and a portion of a nuclear reactor.

With reference to the drawings wherein like numerals represent like parts throughout the figures, a plug assembly, in accordance with the present invention, is generally designated by the numeral 10 in FIGS. 2 and 3. The plug assembly 10 has a one piece construction manufactured from an anti-galling stainless steel alloy bar or plate. The plug assembly is especially adapted to plug flow holes 12 which are existent in the core support barrel 14 of a nuclear reactor illustrated generally by the numeral 15 in FIG. 1. A thermal neutron shield 16 surrounds the core barrel. The shield 16 is positioned in adjacent spaced relationship relative to the flow holes 12 for which the invention has particular applicability. An annulus 18 is thus formed between the inner surface of the neutron shield 16 and the core support barrel 14. The annulus 18, which for many installations is typically on the order of 2 inches, presents a significant headroom constraint at the immediate vicinity of the flow holes which require plugging.

In one application for the invention, in order to modify the core reactor flow path to alleviate fuel rod wear due to coolant flow characteristics, plugging of the flow holes is required. A possible coolant flow path modification is represented by the arrows in FIG. 1. In the typical installation for which the present invention has applicability, there are 16 angularly spaced flow holes 12 in the core support barrel. Each of the flow holes 12 has a diameter of approximately three inches. The juxtaposition of the thermal shield 16 relative to the flow holes presents a significant obstacle to the plugging operation and significantly increases the difficulties of installation of a plug. It is ordinarily desirable that the thermal shield 16 remain intact and that the plug assembly be installed without removing or damaging the thermal shield.

With reference to FIGS. 2 and 3, the plug assembly 10 comprises an offset arm 20 which integrally extends in one, i.e., vertical, direction transverse to the back end of from a hole plug 22. The offset arm 20 is dimensioned so that the plug 22 and the arm can be passed downwardly into the annulus 18 between the core support barrel 14 and the thermal shield 16. In addition, the length of the offset arm 20 is sufficient so that, once the front end of the plug is inserted in the flow hole, the arm may be bolted to the core support barrel at a vertical location above the top of the thermal shield. The offset arm is secured to the core support barrel at an upper location by means of a pair of plug retaining bolts 24 and cooperative locking collars 26.

Figure 4:
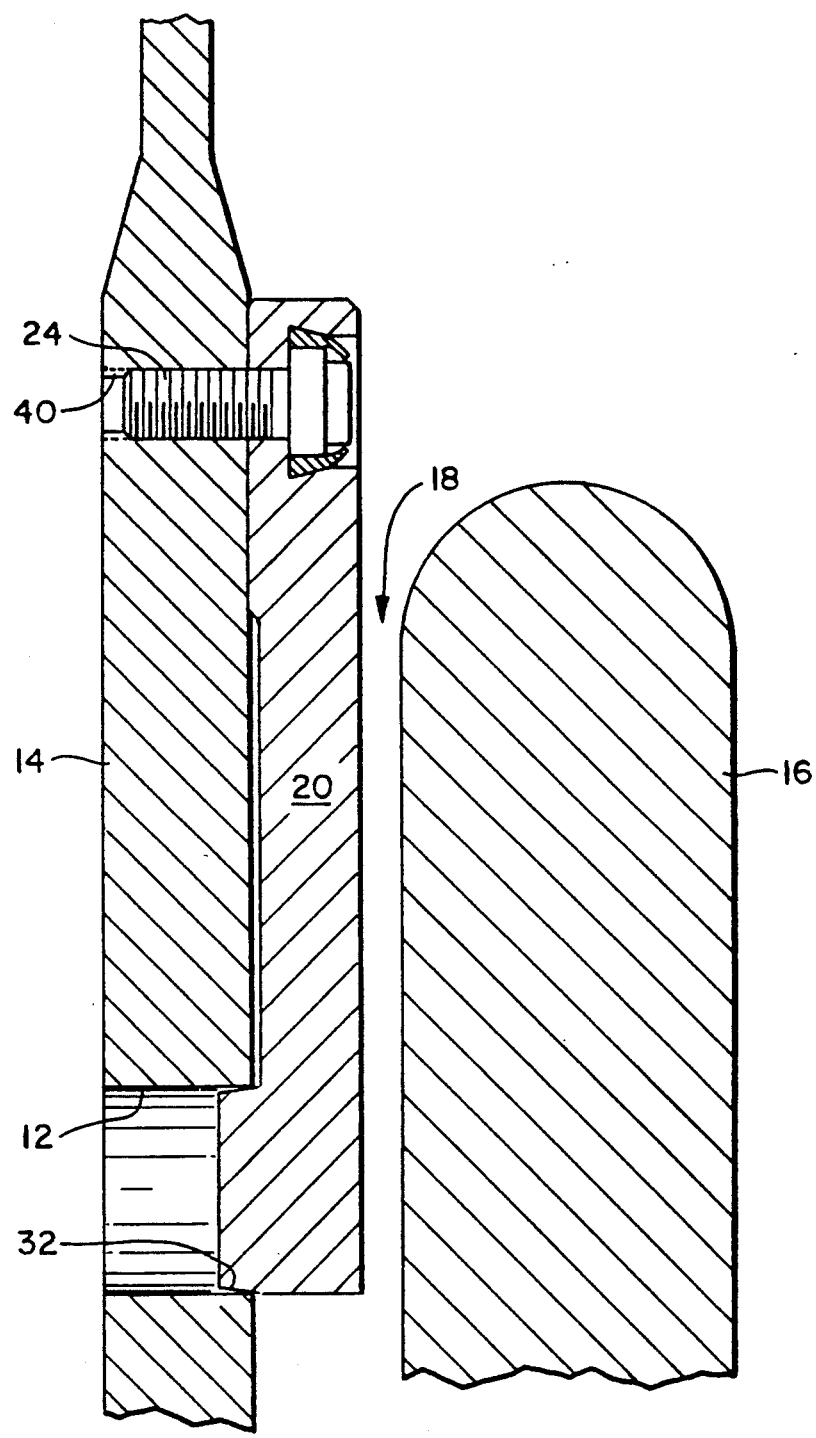

The plug 22 includes a contoured circumferential lip 30 at the front end, which seals the outer edge surface of the core support barrel at the flow hole opening. The plug may alternately include a tapered sealing surface 32 which extends inwardly into the flow hole and seals at the boundary edge of the flow hole when the plug assembly is installed, such as illustrated in FIG. 4. For the later embodiment the sealing lip 30 is not employed.

The offset arm terminates in an enlarged integral mounting head 34 disposed in opposite relationship to the plug 22. A pair of laterally spaced counterbore openings 36 are located in the head 34. The mounting head 34 is contoured to engage the core support barrel in generally surface-to-surface relationship. The intermediate portion 38 of the offset arm is recessed.

A pair of laterally spaced threaded bores 40 are tapped into the core support barrel above the flow hole 12 for securing the retaining bolts 24 to the core support barrel. The bores 40 are equidistantly spaced from the flow hole 12. In preferred form, the two plug retaining bolts 24 are inserted through the openings 36 and the heads of the bolts are locked by associated locking collars 44 to thereby stake the plug assembly to the core support barrel. Preferably, the bores 40 for the bolts are machined into the core support barrel by EDM equipment.

The plug assembly 10 is preferably installed by first precisely locating and then machining the two threaded bores 40 (only one illustrated) into the core support barrel 14. The threaded bores are located above the thermal shield 16 and in a proper symmetric offset relationship with the flow hole 12 mounting the plug assembly. A dual EDM head may be employed.

While the preferred embodiments of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A plug assembly for a flow hole defined by an opening in the wall of a nuclear core barrel comprising:
   plug means having a front end for plugging said flow hole and sealing against said opening, and a back end opposite said front end;
   offset arm means extending rigidly in one direction from the back end of said plug means;
   head means on said offset arm means for engaging said core barrel wall at a location spaced along said direction from said plug means; and
   mounting means for mounting said head means to said core barrel at said location.

2. The plug assembly of claim 1 wherein the front end of said plug means comprises a circumferential sealing lip for engaging the outer surface of said core barrel.

3. The plug assembly of claim 1 wherein said head means defines a pair of openings and said mounting means comprises a pair of bolts insertable through said openings.

4. The plug assembly of claim 3 further comprising a locking collar for each of said bolts.

5. The plug assembly of claim 1 wherein said offset arm means has a recessed portion intermediate said plug means and said head means.

6. The plug assembly of claim 1 wherein said plug means, offset arm means and head means are integrally formed in a one piece member having a stainless steel alloy composition.

7. The plug assembly of claim 1, wherein the front end of said plug means comprises a tapered surface for engaging the outer surface of said core barrel.

8. A method for plugging a flow hole of a core barrel having a shield surrounding said barrel and outwardly spaced from said hole comprising:
   providing a plug member having a plug portion, an offset arm extending from said plug portion, and a head connected to said arm;
   positioning the plug portion at the flow hole; and
   staking the head to the core barrel at a location above the shield.

9. The method of claim 8 and further comprising machining a threaded opening in the core barrel at a location above the shield.

10. The method of claim 9 wherein staking the head arm further comprises securing a fastener in said threaded opening.

11. The method of claim 8 and further comprising machining a pair of threaded openings in said core barrel and driving a pair of bolts into said threaded openings.

12. A nuclear reactor assembly comprising;
   core barrel means defing a flow hole;
   thermal shield means surrounding said barrel means and spaced from said flow hole, said shield means having a top;
   plug means for plugging said flow hole and sealing said barrel means;
   offset arm means extending generally vertically from said plug means;
   head means connected to said arm means for engaging said core barrel means at a location vertically spaced from said flow hole and at a vertical height above said top; and
   mounting means for mounting said head means to said core barrel means.

13. The assembly of claim 12 wherein said plug means comprises a circumferential sealing lip for engaging the outer surface of said core barrel means.

14. The assembly of claim 12 wherein said head means defines a pair of openings and said mounting means comprises a pair of bolts insertable through said openings and threaded to said core barrel means.

15. The assembly of claim 14 further comprising a locking collar for each of said bolts.

16. The assembly of claim 12 wherein said offset arm means has a recessed portion intermediate said plug means and said head means.

17. The assembly of claim 12 wherein said plug means, offset arm means and head means are integrally formed in a one piece member having a stainless steel alloy composition.

18. The assembly of claim 12 wherein said plug means comprises a tapered surface engaging the outer surface of said core barrel means.

* * * * *